US008655070B1

(12) United States Patent
Yang et al.

(10) Patent No.: US 8,655,070 B1
(45) Date of Patent: Feb. 18, 2014

(54) TREE DETECTION FORM AERIAL IMAGERY

(75) Inventors: Lin Yang, Birmingham, AL (US); Xiaqing Wu, San Mateo, CA (US); Emil Praun, Union City, CA (US)

(73) Assignee: Google Inc., Mountain View, CA (US)

( * ) Notice: Subject to any disclaimer, the term of this patent is extended or adjusted under 35 U.S.C. 154(b) by 783 days.

(21) Appl. No.: 12/836,849

(22) Filed: Jul. 15, 2010

Related U.S. Application Data (60) Provisional application No. 61/258,057, filed on Nov. 4, 2009.

(51) Int. Cl.
*G06K 9/00* (2006.01)
*G06K 9/34* (2006.01)
*G06K 9/62* (2006.01)

(52) U.S. Cl.
USPC ............ 382/173; 382/100; 382/209; 382/224

(58) Field of Classification Search
USPC .................................. 382/173, 180, 224, 209
See application file for complete search history.

(56) References Cited

U.S. PATENT DOCUMENTS

| 7,212,670 | B1* | 5/2007 | Rousselle et al. ............. 382/173 |
| 8,194,916 | B2* | 6/2012 | Ma ................................ 382/100 |
| 8,208,689 | B2* | 6/2012 | Savolainen et al. ........... 382/110 |
| 8,254,640 | B2* | 8/2012 | Ma ................................ 382/110 |
| 8,300,896 | B2* | 10/2012 | Kelle et al. .................... 382/109 |

OTHER PUBLICATIONS

Lodha, S.K.; Fitzpatrick, D.M.; Helmbold, D.P., "Aerial Lidar Data Classification using AdaBoost," 3-D Digital Imaging and Modeling, 2007. 3DIM '07. Sixth International Conference on , vol., No., pp. 435,442, Aug. 21-23, 2007.*
Suresh K. Lodha and Darren M. Fitzpatrick and David P. Helmbold, "Aerial lidar data classification using expectation-maximization", In Proceedings of the SPIE Conference on Vision Geometry XIV, 2007, pp. 1-11.*
Dongfeng Han, Wenhui Li, Xiaosuo Lu, Tianzhu Wang and Yi Wang, "Automatic Segmentation Based on AdaBoost Learning and Graph-Cuts" Image Analysis and Recognition Lecture Notes in Computer Science vol. 4141, 2006, pp. 215-225.*
Wang, L. J. P. Gong and G. S. Biging, "Individual tree-crown delineation and treetop detection in high-spatial-resolution aerial imagery", Photogrammetric Engineering & Remote Sensing 70, pp. 351-357, 2004.*
Pollock, "A Model-based Approach to Automatically Locating Tree Crowns in High Spatial Resolution Images," SPIE Proceedings, 1994, pp. 526-537.*
Bhagavathy, S. and B. Manjunath, "Modeling and Detection of Geospatial Objects Using Texture Motifs", Geoscience and Remote Sensing, IEEE Transactions on Geoscience and Remote Sensing, Dec. 2006, vol. 44 (12):3706-3715.

(Continued)

*Primary Examiner* — Utpal Shah
(74) *Attorney, Agent, or Firm* — Dority & Manning, P.A.

(57) ABSTRACT

Methods and systems for detecting trees in aerial imagery are provided. A method for detecting trees in aerial imagery may include training a pixel-level classifier to assign a tree or non-tree label to each pixel in an aerial image. The method may further include segmenting tree and non-tree regions of the labeled pixels. The method may also include locating individual tree crowns in the segmented tree regions using one or more tree templates. A system for detecting trees in aerial imagery may include a trainer, a segmenter and a tree locator.

21 Claims, 6 Drawing Sheets (56) References Cited

OTHER PUBLICATIONS

Boriah, S. et al., "Land Cover Change Detection: a Case Study", KDD 2008: Proceedings of the 14th ACM SIGKDD International Conference on Knowledge Discovery and Data Mining, New York, NY, USA, 2008, pp. 857-865.

Boykov, Y. and V. Kolmogorov, "An Experimental Comparison of Min-cut/Max-flow Algorithms for Energy Minimization in Vision", Proceedings of "EMMCVPR", LNCS 2134, Sophie Antipolis, France, 2001, pp. 359-374.

Chang, C-C and C-J. Lin, "LIBSVM: a library for support vector machines", 2001, Software available at http://www.csie.ntu.edu.tw/cjlin/libsvm. Page downloaded on Oct. 20, 2010.

Charaniya, A. et al., "Supervised Parametric Classification of Aerial LiDAR Data", Proceedings of the 2004 Conference on Computer Vision and Pattern Recognition Workshop, 2004, vol. 3., Jun. 2004, 8 pages.

Chen, G and A. Zakhor, "2d Tree Detection in Large Urban Landscapes Using Aerial Lidar Data", Proceedings of the 16$^{th}$ IEEE International Conference on Image Processing, 2008, Feb. 2009, pp. 1673-1676.

Chiang, Y.-Y. and C. A. Knoblock, "Automatic Extraction of Road Intersection Position, Connectivity, and Orientations from Raster Maps", In GIS '08: Proceedings of the 16th ACM SIGSPATIAL International Conference on Advances in Geographic Information Systems, Nov. 2008, pp. 1-10.

Chong, H. Y. et al., "A Perception-Based Color Space for Illumination-Invariant Image Processing", ACM Trans. Graph., 2008, vol. 27 (3), pp. 1-7.

Freund, Y. and R. E. Schapire, "A decision-theoretic generalization of on-line learning and an application to boosting", Proceedings of the Second European Conference on Computational Learning Theory, Mar. 1995, 15 pages.

Greenberg, J. A. et al., "Shadow Allometry: Estimating Tree Structural Parameters Using Hyperspatial Image Analysis". Remote Sensing of Environment 97, 2005, pp. 15-25.

Hays, J. and A. A. Efros. "Scene Completion Using Millions of Photographs", International Conference on Computer Graphics and Interactive Techniques, ACM SIGGRAPH 2007 Papers, San Diego, CA, 2007, 7 pages.

Lowe, D. G., "Distinctive Image Features from Scale-Invariant Keypoints", International Journal of Computer Vision, vol. 60 (2), 2004, pp. 91-110.

Martin, D. et al., "A Database of Human Segmented Natural Images and its Application to Evaluating Segmentation Algorithms and Measuring Ecological Statistics", Proceedings of the 8th International Conference on Computer Vision, vol. 2, Jul. 2001, 8 pages.

Oliva, A. and A. Torralba, "Modeling the Shape of the Scene: A Holistic Representation of the Spatial Envelope", International Journal of Computer Vision, 42(3), 2001, pp. 145-175.

Porway, J. et al., "A Hierarchical and Contextual Model for Aerial Image Understanding", 2008 IEEE Conference on Computer Vision and Pattern Recognition, Jun. 2008, pp. 1-8.

Sirmacek, B. and C. Unsalan, "Urban-Area and Building Detection Using SIFT Keypoints and Graph Theory", IEEE Transactions on Geoscience and Remote Sensing, vol. 47 (4), Apr. 2009, pp. 1156-1167.

Wolf, B.-M. and C. Heipke, "Automatic extraction and delineation of single trees from remote sensing data", Machine Vision and Applications, vol. 18, 2007, pp. 317-330.

Wu, X. et al., "Automatic Alignment of Large-scale Aerial Rasters to Road-maps", ACM GIS 2007: Proceedings of the 15th International Symposium on Advances in Geographic Information Systems, 2007, 8 pages.

\* cited by examiner

FIG. 1A Tree cover for urban areas

FIG. 1B Augmented 3D city modeling

FIG. 2A Individual feature weights 2 1 0

FIG. 2B Grouped feature weights

The top row shows the tree detection results for two sample aerial images.

FIG. 3

TYPICAL FAILURE CASES (a) Grass  (b) Water (c) Objects with similar color and texture to trees (cover)  (d) Un-trained tree types

TREE DETECTION FORM AERIAL IMAGERY

CROSS REFERENCE TO RELATED APPLICATIONS

This application claims the benefit of U.S. Provisional Appl. No. 61/258,057, filed Nov. 4, 2009, which is hereby incorporated by reference in its entirety.

BACKGROUND

1. Field

Embodiments relate to image detection and satellite and aerial imagery.

2. Related Art

Detecting trees from above the Earth's surface is increasingly important in geographical information systems, models and applications. Depending on their input data, three methods of tree detection include LiDAR-based, NIR-based, and image-based methods. Light Detection and Ranging (LiDAR) and Near Infrared (NIR) are remote sensing technologies which provide geometric and radiometric measures on the Earth surface. Given that most trees fall into a small range on both measures, LiDAR and NIR data provide a strong heuristic on tree detection. However, the availability of remote sensing imagery is very limited compared to aerial imagery. On the other hand, significant progress has been made on image-based object recognition in the computer vision community.

Current methods of object detection from aerial imagery propose image-based features for extracting roads, intersections, buildings and compound objects such as harbors from aerial imagery. However, such man-made objects have a defined shapes and recurrent patterns, so the features cannot be directly applied to tree detection. Tree detection is necessary to find out where to place tree models in a geographical model or geographical information system (GIS).

Some tree detection methods propose a method for parsing aerial imagery into an object hierarchy. An aerial image is learned at both scene and object levels with color histogram and a bag of scale-invariant feature transform (SIFT) features. Contextual constraints are then applied to resolve the ambiguities of learned results (e.g., cars on top of trees). However, since the object inference is learned in the context of multiple objects, the discriminating power is lowered. The final results may contain many false positives (about 20% for trees), even after contextual constraints are applied.

BRIEF SUMMARY

Embodiments are provided including methods and systems for detecting trees in imagery such as aerial imagery. According to an embodiment, a method for detecting trees in aerial imagery may include training a pixel-level classifier to assign a tree or non-tree label to each pixel in an aerial image. The method may further include segmenting tree and non-tree regions of the labeled pixels. The method may also include locating individual tree crowns in the segmented tree regions using one or more tree templates.

According to another embodiment, a system for detecting trees in aerial imagery may include a trainer configured to train a pixel-level classifier to assign a tree or non-tree label to each pixel in an aerial image. The system may also include a segmenter configured to segment tree and non-tree regions of the labeled pixels. The system may further include a locator configured to locate individual tree crowns in the segmented tree regions using one or more tree templates.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments are described with reference to the accompanying drawings. In the drawings, similar reference numbers may indicate identical or functionally similar elements. The drawing in which an element first appears is generally indicated by the left-most digit in the corresponding reference number.

DETAILED DESCRIPTION

Aerial imagery captures a wide variety of natural and man-made objects on Earth. Aerial imagery, as used herein, includes imagery captured from a perspective above the ground. Such aerial imagery may include imagery captured from a tower, building or plane and may also include satellite imagery or airborne imagery. Detecting such objects may benefit Geographical Information Systems (GIS). Embodiments of the present invention are directed to tree detection from aerial or satellite imagery. Tree detection results can assist in various applications such as urban planning and 3D city modeling, as shown in FIG. 1.

Figure 1A:
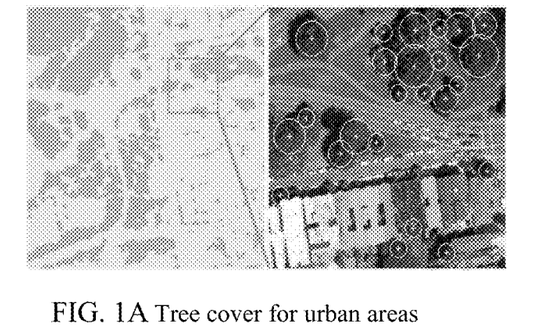
FIGS. 1A and 1B are examples showing two sample applications for tree detection from aerial imagery, according to embodiments.
Figure 1B:
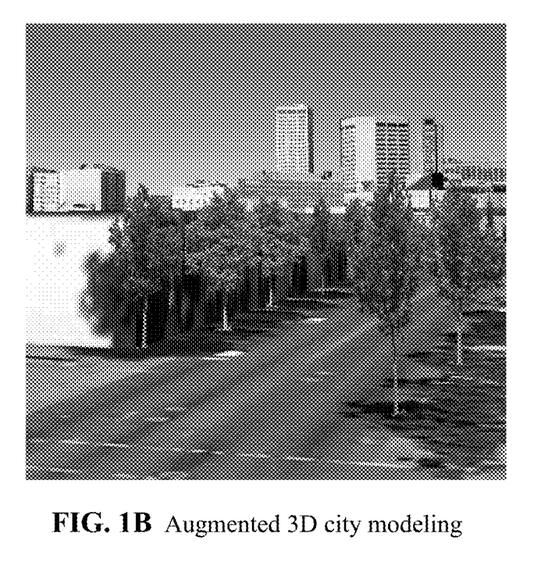

FIG. 1 shows two sample applications for tree detection from aerial imagery, according to embodiments. FIG. 1(a) (left) shows the tree cover for the north-west region of San Francisco, which is based on the results of tree segmentation discussed below. FIG. 1(a)(right) shows a zoom-in view of detected tree crowns. The study of tree cover has a potential impact on urban planning. FIG. 1(b) shows 3D city modeling for San Francisco. The view is augmented by tree models at detected tree locations from aerial images to enhance the user experience.

According to an embodiment, tree detection may proceed in two stages. During a first stage, a pixel-level classifier may be trained to assign a {tree, non-tree} label to each pixel in the aerial image based on a set of visual features. In some cases, a label may be given to groups or blocks of pixels. The pixel-level classification may then be refined by considering the local smoothness of pixel labeling to generate a clean segmentation of tree and non-tree regions. During a second stage, a set of tree templates may be used to correlate with the classification results and locate candidate tree crowns. The tree crowns are then selected, for example, in a greedy manner, to maximize correlation scores while minimizing the overlap.

Figure 2A:
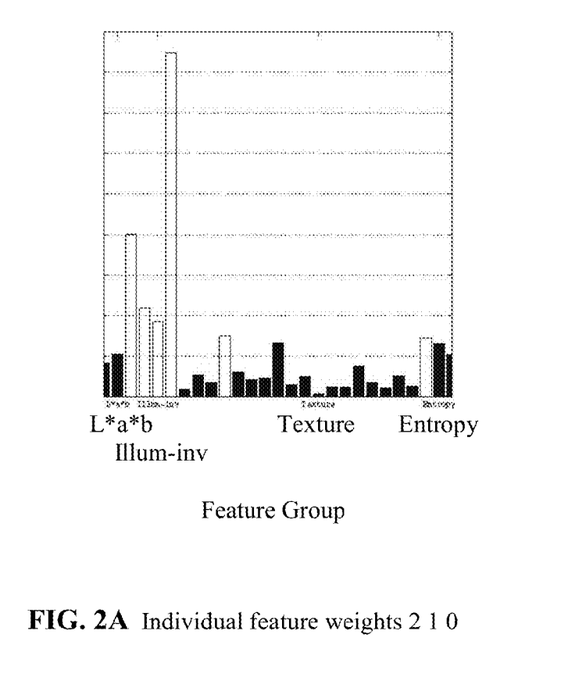
FIGS. 2A and 2B illustrate charts representing weights of learned individual features and learned grouped features, according to embodiments.
Figure 2B:
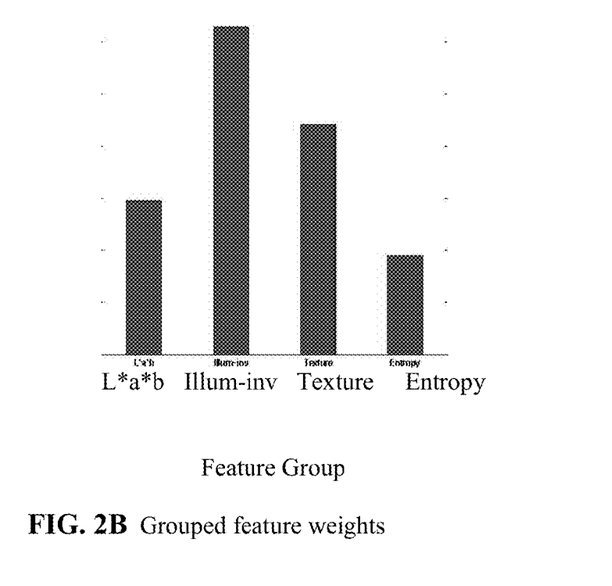
Figure 3:
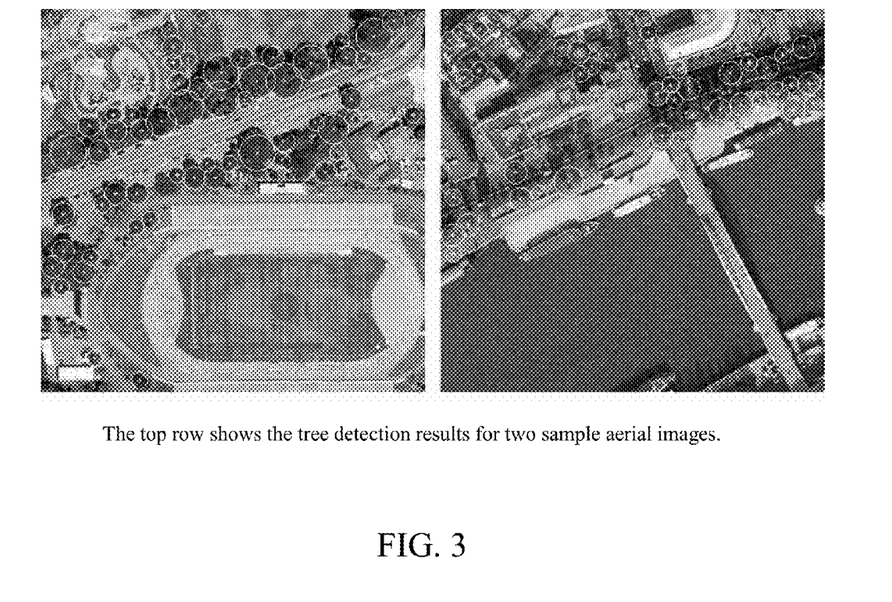
FIG. 3 illustrates tree detection results for two sample aerial images, according to an embodiment.
Figure 4:
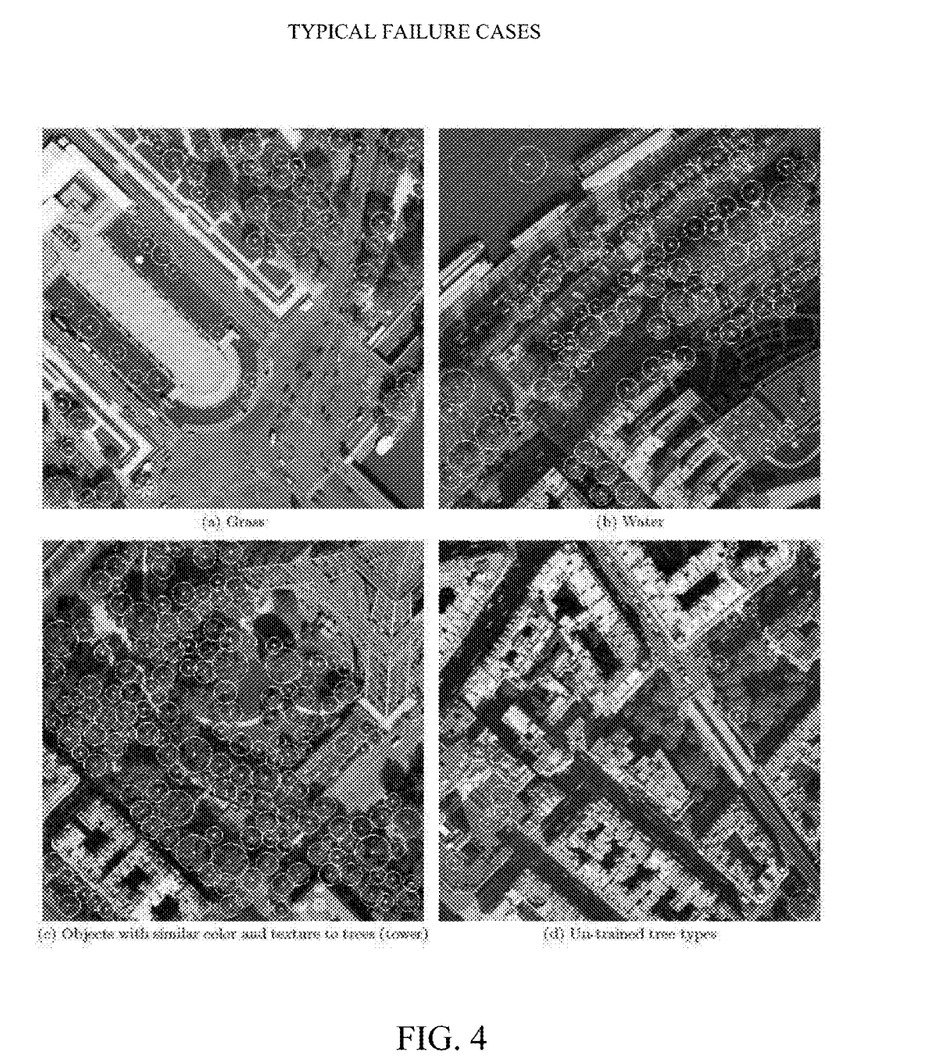
FIG. 4 illustrates examples of typical failure cases of tree detection.
Figure 5:
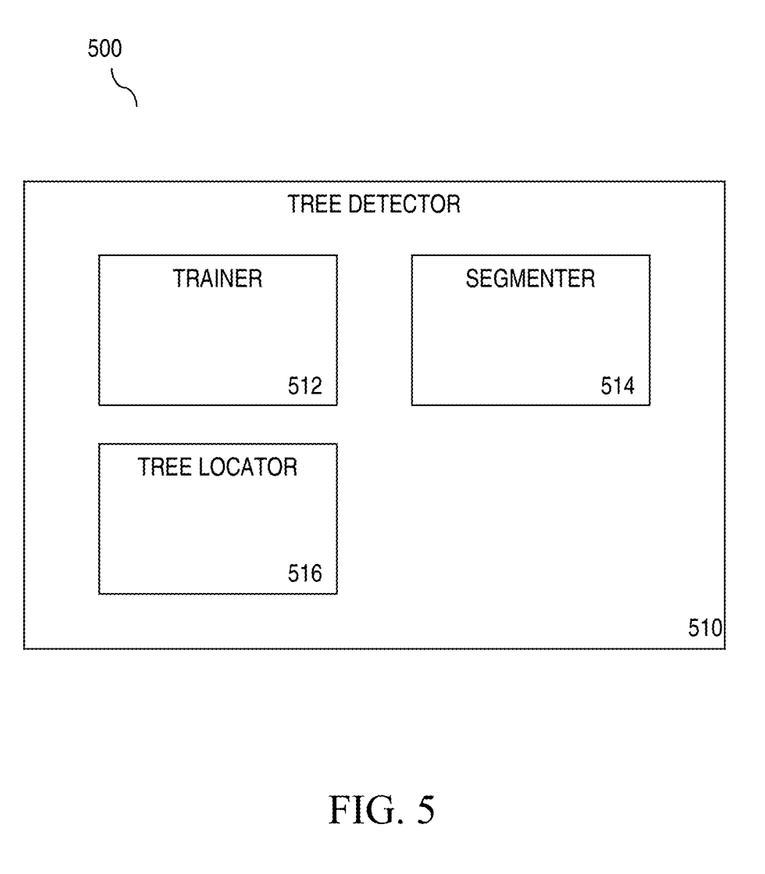
FIG. 5 illustrates a system for detecting trees in aerial imagery, according to an embodiment.
Figure 6:
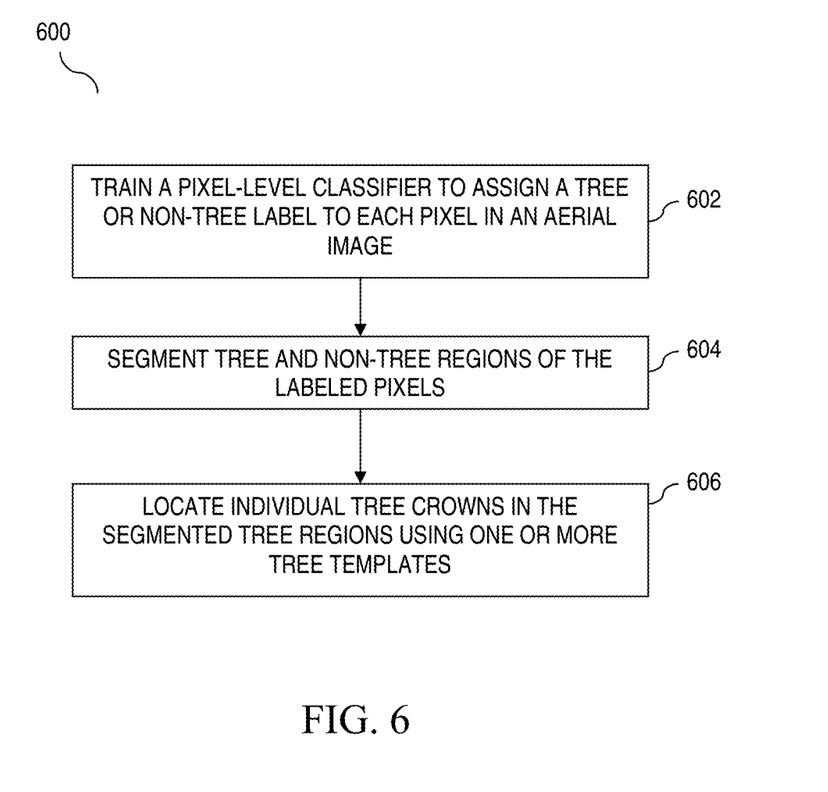
FIG. 6 is a flowchart illustrating a method for detecting trees in aerial imagery, according to an embodiment.

Next, an exemplary systems and methods for use in tree detection are described with respect to FIGS. 5 and 6, respectively. Information on examples in FIGS. 2-4 is also incorporated into the discussion below. FIG. 5 illustrates an exemplary system 500 for use in tree detection from aerial images, according to an embodiment. Tree detector 510 may include trainer 512, segmenter 514 and tree locator 516. Trainer 512 may be configured to train a pixel-level classifier to assign a tree or non-tree label to each pixel in an aerial image. Training and classification are further discussed below. Segmenter 514 may be configured to segment tree and non-tree regions of the labeled pixels. Tree locator 516 may be configured to locate individual tree crowns in the segmented tree regions using one or more tree templates.

Exemplary system 500 may be part of, or coupled to, a 3D modeling system, according to an embodiment. Exemplary system 500 or any part of system 500 may be a part of or may be executed by one or more computing devices. A computing device can be any type of computing device having one or more processors. For example, a computing device can be a workstation, mobile device (e.g., a mobile phone, personal digital assistant, or laptop), computer, server, compute cluster, server farm, game console, set-top box, kiosk, embedded system or other device having at least one processor and memory. Embodiments of the present invention may be software executed by a processor, firmware, hardware or any combination thereof in a computing device. According to a further embodiment, system 500 may be coupled to or may include one or more databases.

Compared to previous methods, these embodiments can use just the RGB channels of aerial imagery for tree detection and achieve >90% accuracy in pixel-level tree classification. According to a further embodiment, a training procedure for the pixel-level classifier is open for any pixel-level features (such as LiDAR and NIR data). Therefore, embodiments of this method can be conveniently incorporated into existing methods to boost the performance for tree detection.

The scalability of the proposed approach is also addressed. Since training a pixel-level classifier may require manual creation of ground-truth tree masks, embodiments may include methods for automatic model and training data selection, so that the amount of training data can be minimized. Embodiments of this invention have been performed on a large urban area using only 1% of the aerial images as training data. By applying model and training data selection, >90% accuracy may be achieved in pixel-level tree classification, which advances the baseline training method by 5%.

Tree/Non-Tree Segmentation

FIG. 6 illustrates a flowchart for detecting trees in aerial imagery, according to an embodiment. In this section, steps 602 and 604 of the embodiment are discussed. Steps 602 and 604 involve segmenting an aerial image to tree and non-tree regions. Tree and non-tree regions may be segmented by applying a pixel level classification based on a set of visual features. Step 602 includes training a pixel-level classifier to assign a tree or non-tree label to each pixel in an aerial image. In some cases, a label may be assigned to a group of pixels or block of pixels. This initial training may be followed by a partitioning method for refinement. Step 604 includes the segmenting of tree and non-tree regions of the labeled pixels. While many previous methods use object-oriented image segmentation, few are dedicated to large-scale GIS data. According to a further embodiment, the selection of visual features and classifiers may be tuned for an optimal balance of speed and accuracy. Embodiments of steps 602 and 604 may be carried out by trainer 512 and segmenter 514 are further described below.

Feature Selection

Since pixel-level classification is applied, all the visual features may be selected at the pixel level, according to an embodiment. According to some embodiments, pixel-level features may already capture the most distinctive properties of trees. The adoption of pixel-level features allows convenient incorporation of LiDAR and NIR data without changing the pipeline. Higher order geometric features (edges, shapes, etc.) or bag of words models (quantized SIFT, textons, etc.) may be used in other embodiments.

Color

Color is undoubtedly the most revealing feature for trees. According to an embodiment, RGB (red, green, blue) channels of each aerial image may be converted to CIE L*a*b* color space for a better perceptual uniformity. The RGB channels may also be converted to the illumination-invariant color space for some robustness against the change of lighting condition. Illumination-invariant color space is further described in H. Y. Chong, S. J. Gortler, and T. Zickler, *A perception-based color space for illumination-invariant image processing*, ACM Trans. Graph., 27(3):1-7, 2008. According to a further embodiment, the two color representations may be concatenated to form a 6-dimensional feature vector at each pixel.

Texture

The texture pattern formed by tree leaves can often distinguish trees from similarly colored objects such as grass and tennis courts. According to an embodiment, the luminance (L) channel of each aerial image may be convolved with a filter-bank to generate a set of filter responses at each pixel as its texture feature. In some embodiments, first and second order derivatives of Gaussians may be empirically chosen to form the filter-bank. The filter-bank is formed by first and second order of Gaussians on 3 scales (with $\sigma=1, 2, 2$) and 6 orientations, which generates an 18-dimensional feature vector at each pixel. In other embodiments, other kernels such as Gabor filter achieve a similar performance.

Entropy

Entropy measures the uncertainty of a random variable. In some cases, this is the L channel of aerial images. Because of shadows, tree leaves tend to exhibit a substantially higher entropy compared to man-made objects such as roads and buildings. According to some embodiments, the entropy of each pixel within 5×5, 9×9, and 17×17 search windows on the L channel of the image may be computed. According to further embodiments, the latter two can be efficiently approximated by iteratively down sampling the image and keeping the search window at 5×5. Entropy values may be concatenated to form a 3 dimensional feature vector at each pixel.

Finally, by concatenating color, texture and entropy features, a 27-dimensional feature vector is formed at each pixel, according to an embodiment. If other informative features are available (e.g., LiDAR and NIR), they can be conveniently concatenated here, without any changes on the rest of the pipeline.

Pixel-Level Classification

Each of the 27 visual features at each pixel alone can be used to construct a weak classifier for tree detection, according to an embodiment. In order to faun a discriminative combination, the Adaboost technique may be adopted to train a strong classifier based on these weak classifiers, according to a further embodiment. The Adaboost technique is further described in Y. Freund and R. E. Schapire, *A decision-theoretic generalization of on-line learning and an application to boosting*, Proc. Second European Conference on Computational Learning Theory, 1995.

FIG. 2 shows weights of (a) individual features and (b) grouped features learned by Adaboost, according to an embodiment.

$$H(x) = \sum_{t=1}^{T} \alpha_t h_t(x), \quad (1)$$

where x is the feature vector at a pixel to be predicted, and H(x) is the output of the strong classifier. sign(H(x))∈{+, −} gives a prediction of {tree, non-tree} at the pixel, and |H(x)| gives a confidence score of the prediction. In the sequel, the confidence score is normalized to tree probability in [0, 1] by the sigmoid function:

$$P_{tree}(x) = \frac{1}{1 + e^{-H(x)}}. \quad (2)$$

A basic decision stump on a single feature as the weak classifier $h_t(x)$ may be adopted:

$$h_t(x) = \begin{cases} 1 & sx_{i(t)} > s\theta_t, \\ 0 & \text{otherwise.} \end{cases} \quad (3)$$

According to some embodiments, T=200 weak classifiers have been used. The parameterization for each weak classifier s∈{+, −}, i(t)∈{1, . . . , 27} and $\theta_t$, along with their weights $\alpha_t$, may be automatically learned by the Adaboost technique.

Once a strong classifier is trained, predicting each pixel may only take a linear combination of stump decisions. In an initial study, according to an embodiment, a 512×512 aerial image takes 15 seconds to be classified by the Adaboost technique, as opposed to 15 minutes by nonlinear SVM (support vector machines), while both achieve comparable accuracies.

Classification Refinement

One disadvantage of pixel-level classification is that each pixel is predicted independently. The consistency among adjacent pixels may not be considered. Therefore the results may be noisy (e.g., shadowed tree leaves are labeled as nontree; sparse points on a grass field are labeled as tree; etc.). In this section, pixel-level classification results may be refined to a clean segmentation of tree and non-tree regions by optimizing the consistency between all pairs of neighboring pixels, according to an embodiment.

The refinement is formalized as an energy minimization problem and solved by a graph cuts algorithm. According to some embodiments, a graph cuts algorithm may be used such as that described by Y. Boykov and V. Kolmogorov, *An experimental comparison of min-cut/max flow algorithms for energy minimization in vision*, IEEE Transactions on Pattern Analysis and Machine Intelligence, 26:359-374, 2001. According to an embodiment, the energy function may be defined as follows:

$$E = \sum_{p \in P} D(p, L(p)) + \sum_{p,q \in N} V(L(p), L(q)) \quad (4)$$

where P is the set of all pixels, L(p)∈{tree, non-tree} gives the label of pixel p, and N is the set of all neighboring pairs of pixels (pixels are 8-connected). The data term D measures the agreement between the assigned label and the tree probability given by an Adaboost technique, and the smoothness term V measures the local smoothness of labeling:

$$D(p, L(p)) = \begin{cases} \log(1 - P_{tree}(p)) & L(p) = \text{tree}, \\ \log(P_{tree}(p)) & \text{otherwise}, \end{cases} \quad (5)$$

$$V(L)(p), L(q)) = \begin{cases} 0 & L(p) = L(q) \\ \beta & \text{otherwise}, \end{cases} \quad (6)$$

where β is empirically set to 1.

The top row of FIG. 3 shows tree detection results for two sample aerial images. These results may be further refined, according to an embodiment. These results may show a clean segmentation after graph cuts optimization. Small holes in tree crowns may be filled with tree labels. More importantly, false tree labels on the soccer field and the river may be corrected, which is fundamental for the subsequent tree localization.

Notice that, while simpler techniques for image denoising exist such as morphological close and open operations (a dilation followed by erosion), they are incapable of taking into account the labeling probabilities. For example, regarding FIG. 3, a dilation followed by erosion on classification results is likely to generate small tree regions on the soccer field and the river because of the locally dense tree labels, even though the probabilities supporting those labels are very low. Such examples of field an river errors are shown in FIG. 4.

Tree Localization

Based on the refined tree segmentation, this section discusses step 606 of FIG. 6.

According to embodiments, step 606 may be performed by tree locator 516. Step 606 includes locating individual tree crowns in the segmented tree regions using one or more tree templates, according to an embodiment. In some cases, this step may involve locating each individual tree and providing an estimate of its crown size. For this task, template matching may be used. According to an embodiment, template matching may be applied to 4 channels: the R, G, B channels of the original aerial image, and the channel P of tree probabilities given by Adaboost classification. Values of the R, G, B, P channels may be scaled to [0, 1].

During the training stage, the R, G, B channels of a tree template may be formed by averaging multiple ground-truth tree crowns with the same radius, according to some embodiments. The P channel of a tree template is simply a binary disk (with 1 inside and 0 outside) with the same radius as the template. Multiple templates with various radiuses can be formed depending on the geographic region. In some embodiments, 4 tree templates may be Ruined for each data set with radiuses ranging from 2 m to 8 m.

Based on the refined tree segmentation given by graph cuts, template matching may be constrained within the tree regions at discrete locations (sampled at half-radius step), according to an embodiment. At each location, the tree templates may be correlated with the aerial image and the normalized correlation score may be stored along with the template itself to a candidate list. In some cases, template matching does not handle trees crossing image boundaries. In other cases, the boundary effect may be reduced by stitching adjacent images together.

A candidate list contains a number of overlapping template matches covering tree regions of the aerial image. In order to maximize the likelihood of all template matches while minimizing their overlaps, the final set of template matches may be selected in a greedy manner, according to an embodiment. First the candidate list is thresholded by a minimum correlation score of $\theta_{corr}$. Template matches with scores lower than $\theta_{corr}$ are removed. The rest of the candidate list is sorted in descending order of correlation score. Then in each round, the top template match of the list is selected into the final set, and the rest of the template matches in the list are removed if their overlap with the selected one exceeds certain threshold $\theta_{overlap}$. The process iterates until all the template matches in the candidate list are either selected or removed.

According to an embodiment, threshold score $\theta_{corr}$ may be empirically set to 0.25 and use a simple metric to define the overlap between two templates:

$$\text{Overlap}(T_i, T_j) = \frac{(R_i, R_j - \text{distance}(C_i, C_j))}{\min(R_i, R_j)} \quad (7)$$

where $R_i$ and $C_i$ are the radius and center of template match $T_i$, and the threshold $\theta_{overlap}$ is set to 0.25 (the outer quarter of a crown can overlap with other crowns).

EXPERIMENTATION RESULTS OF CERTAIN EMBODIMENTS

Experimentation results were collected using an embodiment of the invention. Aerial images for San Francisco (about 1500 512×512 pixel tiles), Paris (about 4000 tiles), and New York (about 4500 tiles) were collected for experimentation. In this embodiment, the resolution for each aerial image was between 0.5 m and 1 m per pixel. 1% of the tiles from each data set were manually masked for training the pixel-level classifier and collecting tree templates. The tree detection procedure was applied to the rest of the tiles. An end-to-end processing for each tile took less than 30 seconds in average. An illustration for a portions of end-to-end processing is shown in FIG. 3.

According to this embodiment, a collection of visual features was adopted to capture the properties of trees. The question of which of the visual features were more discriminative for the task of tree detection was considered. Given that Adaboost associates a weight to each weak classifier, and each weak classifier is a decision stump based on a single visual feature, the weights of all the weak classifiers were aggregated into the bins for their associated feature to approximate the total weight for each visual feature. In FIG. 2, the weights for individual features as well as grouped features (L, a, b grouped together as L*a*b*, etc.) are shown. Since color takes a dominant amount of weight, L*a*b* and illumination-invariant color features were kept as separate groups. According to this embodiment, color features were shown be the most discriminative feature for trees, and the illumination-invariant representation was more powerful than CIE L*a*b*. Texture features on a single scale and orientation were weak (which is reasonable because the texture of tree leaves has random orientations), but combined together still had a significant impact on the final classification. Entropy as a group feature was the least discriminative among all, but the entropies of each of the individual scales had comparable weights to the individual L, a, b color features.

In large-scale tree detection, false detections might be inevitable. In the case of some embodiments, typical failure cases are caused by locally indistinguishable objects such as grass, a river, etc. or by an unrepresentative training set. FIG. 4 shows a few examples. Notice that if LiDAR or NIR data is available, the pixel-level classifier may be able to eliminate most false detections on the river or man-made objects (FIG. 4(b) and (c)). LiDAR and NIR data may be incorporated in further embodiments.

Tree Detection for the Globe

One common bottleneck for GIS applications is the gigantic amount of data that needs to be processed. The bottleneck is especially significant if supervised training is involved. In some cases, the training of a pixel-level classifier requires manual creation of ground-truth tree masks. If it takes a large percentage of the data to train a discriminative classifier, the manual work required by processing the entire globe will be prohibitively expensive.

In this section, the scalability of pixel-level classification is addressed. Some embodiments may include methods for model and training data selection in order to minimize the percentage of data used for training while achieving a reasonable accuracy.

One principle for machine learning methods is that a representative set of positive and negative samples should be seen in the training data in order to train a robust classifier. Take tree classification for example, if a geographic region contains a lake, but none of the lake views appears in the training data, then the classifier is likely to perform poorly on the lake because it looks more similar to positive samples (trees) than negative ones (ground, buildings, etc.). On the other hand, if the geographic region is enlarged to a larger land coverage, the diversity of geographic features (e.g., ground, grass, trees, buildings, lakes, etc.) will grow at a lower rate, because the total number of geographic features in the region is very limited compared to the area. Based on this observation, large-scale aerial imagery with similar geographic features may be clustered, according to an embodiment. Model and training data selection from the clustering results may be applied.

Since a pixel-level classifier is trained on visual features, aerial images may also be clustered into visually coherent clusters. A color-augmented Gist descriptor may be adopted to encode the geographic features for aerial images, according to an embodiment. A Gist descriptor is described in A. Oliva and A. Torralba, *Modeling the shape of the scene: A holistic representation of the spatial envelope*, International Journal of Computer Vision, 42:145-175, 2001. The Gist descriptor computes a low dimensional representation for the scene structure of an image, and has been shown to convey higher level semantics of images in the computer vision community. According to a further embodiment, the Gist descriptor is formed by convolving an aerial image with Gabor filters on 3 scales with 8, 8, and 4 orientations respectively, and aggregating the filter responses into 4×4 spatial bins, which gives a 320 dimensional descriptor for each aerial image. An 8×8×8 joint color histogram in the L*a*b* space may also be computed to form a 512 dimensional color descriptor. The Gist and color descriptors may both be normalized to unit L−1 norm and concatenated together to form the descriptor for an aerial image. After the descriptors are computed for all aerial images, Principal Component Analysis (PCA) may be applied to reduce the dimensionality of descriptors to 12 while preserving about 95% of the total variance of the original descriptors.

Experiments were performed with three training methods on the New York data set with about 4500 tiles, according to some embodiments. The three methods were constrained to use 1% of the tiles (45 tiles) as training data.

Baseline: 45 training tiles were uniformly sampled in the geographic region.

Cluster-I: k-means was applied to the image descriptors to divide the dataset into 45 clusters, and the training tiles were selected as cluster centroids.

Cluster-II: Two-level clustering was applied to the image descriptors. The first level k-means divided the data set into 4 clusters. Within each cluster, the method of Cluster-I was used to select 1% as training tiles. The training tiles of each cluster were used to train a separate classifier dedicated to the tiles in that cluster.

In order to compare the performance of the three methods, according to some embodiments, 100 tiles from the data set were randomly sampled (none appeared in any of the three training sets) and manually created the ground-truth masks for validation. The confusion matrices and accuracies for all three methods are shown in Table 1. It is shown that Cluster-II exceeds Cluster-I by approximately 2% and Baseline by approximately 5% in classification accuracy. For 4500 512× 512 tiles of aerial images, a 5% improvement in accuracy means that about 60 million more pixels are correctly labeled. More importantly, the improvement mainly comes from reducing false positives (shown in the second row of confusion matrices), to which most applications are more sensitive (e.g., placing a false tree on the water is much worse than missing a tree in 3D city modeling).

TABLE 1 confusion matrices and accuracies for the three training methods.

|  |  | Baseline | | Cluster-I | | Cluster-II | |
| --- | --- | --- | --- | --- | --- | --- | --- |
|  |  | Tree | NonT. | Tree | NonT. | Tree | NonT. |
| Ground-Truth Labels | Tree | 5.6% | 0.5% | 5.4% | 0.7% | 5.1% | 0.9% |
|  | NonT. | 12.0% | 81.0% | 10.3% | 83.7% | 8.4% | 86.6% |
| Accuracy |  | 86.6% | | 89.1% | | 91.7% | |

CONCLUSION

Approaches to detecting trees in aerial imagery are provided, according to embodiments. Automatic model and training data selection may minimize the manual work and scale the method to the entire globe. Given an aerial image, pixel-level classification followed by global optimization may generate an image segmentation of tree and non-tree regions, according to an embodiment. Based on the image segmentation, template matching may be adopted to locate each individual tree crown and provide an estimate of its crown size, according to a further embodiment.

Embodiments of the invention may operate on pure images only, and be efficient for tree detection in large volumes. Further embodiments may incorporate traditional LiDAR and NIR data with the pipeline for pixel-level tree classification to further boost the accuracy.

To address the scalability of the proposed approach, embodiments may exploit the limited geographic features on Earth and introduce methods for model and training data selection based on two-level clustering. On large data sets, the classifier may be trained on only 1% of the data while achieving >90% accuracy for pixel-level tree classification, according to some embodiments.

Further embodiments of tree detection may include distinguishing trees of different species. The adoption of template matching can implicitly infer certain parameters on the tree crowns. However, more information may still be useful for robust tree species recognition.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present invention and the claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-implemented method for detecting trees in aerial imagery comprising:
   training a pixel-level classifier to assign a tree or non-tree label to each pixel in an aerial image;
   for respective pixels of an aerial image, labeling the pixel as being either tree or non-tree;
   segmenting tree and non-tree regions based on the labels of the respective pixels; and
   locating, with a processor-based system, individual tree crowns in the segmented tree regions of the aerial image using one or more tree templates such that the segmenting reduces a number of false positives from the locating step.

2. The method of claim 1, wherein the segmenting includes automatically segmenting tree and non-tree regions.

3. The method of claim 1, further comprising providing an estimate of a tree's crown size.

4. The method of claim 1, wherein the training includes using a local smoothness of pixel labeling to generate a clean segmentation of tree and non-tree regions.

5. The method of claim 1, wherein the locating includes using a greedy manner to maximize correlation scores while minimizing the overlap.

6. The method of claim 1, wherein the locating includes distinguishing different tree species.

7. The method of claim 1, wherein the training includes clustering aerial images into visually coherent clusters.

8. The method of claim 1, wherein the training includes incorporating Light Detection and Ranging (LiDAR) and Near Infrared (NIR) data with the pipeline for pixel-level tree classification.

9. The method of claim 1, wherein the training includes enlarging geographical land coverage of images used to train the pixel-level classifier.

10. The method of claim 1, wherein the segmenting includes optimizing consistency between all pairs of neighboring pixels using a graphcut algorithm.

11. The method of claim 1, wherein the training includes forming R, G, B channels of a tree template by averaging multiple ground-truth tree crowns with the same radius.

12. The method of claim 1, further comprising displaying trees in a Geographical Information System (GIS) based on locations and crown sizes of detected trees.

13. A system for detecting trees in aerial imagery comprising:
- a pixel-level classifier;
- a trainer configured to train pixel-level classifier to assign a tree or non-tree label to each pixel in an aerial image, wherein the trained pixel-level classifier, for respective pixels of an aerial image, labels the pixel as being either tree or non-tree;
- a segmenter configured to segment tree and non-tree regions based on the labels of the respective pixels; and
- a tree locator, implemented on a processor-based system, configured to locate individual tree crowns in the segmented tree regions of the aerial image using one or more tree templates, wherein the segmenter, by segmenting tree and non-tree regions, reduces a number of false positives located by the tree locator.

14. The system of claim 13, wherein the segmenter is further configured to automatically segment tree and non-tree regions.

15. The system of claim 13, wherein the locator is further configured to provide an estimate of a tree's crown size.

16. The system of claim 13, wherein the trainer is further configured to use a local smoothness of pixel labeling to generate a clean segmentation of tree and non-tree regions.

17. The system of claim 13, wherein the locator is further configured to use a greedy manner to maximize correlation scores while minimizing the overlap.

18. The system of claim 13, wherein the locator is further configured to distinguish different tree species.

19. The system of claim 13, wherein the trainer is further configured to cluster aerial images into visually coherent clusters.

20. The system of claim 13, wherein the trainer is further configured to incorporate Light Detection and Ranging (LiDAR) and Near Infrared (NIR) data with the pipeline for pixel-level tree classification.

21. The system of claim 13, wherein the trainer is configured to enlarge geographical land coverage of images used to train the pixel-level classifier.

\* \* \* \* \*